United States Patent
Li et al.

(10) Patent No.: US 11,588,178 B2
(45) Date of Patent: Feb. 21, 2023

(54) ALL-SOLID-STATE-BATTERY

(71) Applicant: TOYOTA JIDOSHA KABUSHIKI KAISHA, Toyota (JP)

(72) Inventors: Ximeng Li, Susono (JP); Masafumi Nose, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/806,826

(22) Filed: Jun. 14, 2022

(65) Prior Publication Data
US 2022/0320581 A1 Oct. 6, 2022

Related U.S. Application Data

(63) Continuation of application No. 16/853,852, filed on Apr. 21, 2020, now Pat. No. 11,469,445.

(30) Foreign Application Priority Data

Apr. 26, 2019 (JP) .............................. JP2019-086405

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/131* (2013.01); *H01M 4/134* (2013.01); *H01M 10/0525* (2013.01); *H01M 2004/021* (2013.01)

(58) Field of Classification Search
CPC .. H01M 4/131; H01M 4/134; H01M 10/0525; H01M 10/0562
(Continued)

(56) References Cited

U.S. PATENT DOCUMENTS

| | | |
|---|---|---|
| 9,391,329 B2 | 7/2016 | Yoon et al. |
| 2015/0010804 A1 | 1/2015 | Laramie et al. |

(Continued)

FOREIGN PATENT DOCUMENTS

| | | |
|---|---|---|
| CN | 105706274 A | 6/2016 |
| CN | 109526240 A | 3/2019 |

(Continued)

OTHER PUBLICATIONS

Ximeng Li et al., U.S. Office Action dated Mar. 14, 2022 in U.S. Appl. No. 16/853,852.
(Continued)

*Primary Examiner* — James M Erwin
(74) *Attorney, Agent, or Firm* — Dickinson Wright, PLLC

(57) ABSTRACT

Provided is an all-solid-state battery with high charge-discharge efficiency. Disclosed is an all-solid-state battery, wherein the all-solid-state battery comprises a cathode comprising a cathode layer, an anode comprising an anode layer, and a solid electrolyte layer disposed between the cathode layer and the anode layer; wherein the anode layer contains at least one selected from the group consisting of a lithium metal and a lithium alloy; and wherein a protective layer comprising a composite metal oxide represented by Li—M—O (where M is at least one metal element selected from the group consisting of Mg, Au, Al and Sn) is disposed between the anode layer and the solid electrolyte layer.

3 Claims, 2 Drawing Sheets

(51) Int. Cl.
*H01M 4/131* (2010.01)
*H01M 4/134* (2010.01)
*H01M 4/02* (2006.01)

(58) Field of Classification Search
USPC .......................................................... 429/304
See application file for complete search history.

(56) References Cited

U.S. PATENT DOCUMENTS

2019/0051925 A1* 2/2019 Li ........................ H01M 4/134
2019/0088991 A1 3/2019 Hegde et al.
2019/0115162 A1 4/2019 Goodenough et al.

FOREIGN PATENT DOCUMENTS

| JP | 2009-181901 A | 8/2009 |
| JP | 2012-049023 A | 3/2012 |
| WO | 2015/003123 A1 | 1/2015 |
| WO | 2017/214276 A1 | 12/2017 |

OTHER PUBLICATIONS

Ximeng Li et al., U.S. Notice of Allowance dated Jun. 24, 2022 in U.S. Appl. No. 16/853,852.

* cited by examiner

ALL-SOLID-STATE-BATTERY

RELATED APPLICATION

This application is a continuation of U.S. patent application Ser. No. 16/853,852, filed on Apr. 21, 2020 which claims priority to Japanese Patent Application No. 2019-086405, filed on Apr. 26, 2019, including the specification, drawings and abstract, the entire disclosure of which is incorporated herein by reference.

TECHNICAL FIELD

The disclosure relates to an all-solid-state battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of various kinds of batteries, a lithium secondary battery has attracted attention for the following reasons: since it uses lithium, which is a metal having the largest ionization tendency, as the anode, the potential difference between the cathode and the anode is large, and high output voltage is obtained.

Also, an all-solid-state battery has attracted attention, since it uses a solid electrolyte as the electrolyte present between the cathode and the anode, in place of a liquid electrolyte containing an organic solvent.

Patent Literature 1 discloses a battery in which a layer containing one or more elements selected from the group consisting of Cr, Ti, W, C, Ta, Au, Pt, Mn and Mo is arranged between a collector foil and an electrode body.

Patent Literature 2 discloses a solid battery in which a metal oxide layer containing an oxide of at least one metal element selected from the group consisting of Cr, In, Sn, Zn, Sc, Ti, V, Mn, Fe, Co, Ni, Cu and W, is formed at least on an interface between a current collector and a cathode and/or anode adjacent to the current collector.

Patent Literature 1: Japanese Patent Application Laid-Open (JP-A) No. 2012-049023

Patent Literature 2: JP-A No. 2009-181901

An all-solid-state battery in which the anode contains a lithium metal, has the following problem: even if the all-solid-state battery has a conventionally-known battery structure, the charge-discharge efficiency of the all-solid-state battery is low.

SUMMARY

In light of the above circumstances, an object of the disclosed embodiments is to provide an all-solid-state battery with high charge-discharge efficiency.

In a first embodiment, there is provided an all-solid-state battery, wherein the all-solid-state battery comprises a cathode comprising a cathode layer, an anode comprising an anode layer, and a solid electrolyte layer disposed between the cathode layer and the anode layer;

wherein the anode layer contains at least one selected from the group consisting of a lithium metal and a lithium alloy; and wherein a protective layer comprising a composite metal oxide represented by Li—M—O (where M is at least one metal element selected from the group consisting of Mg, Au, Al and Sn) is disposed between the anode layer and the solid electrolyte layer.

The thickness of the protective layer may be from 30 nm to 300 nm.

The composite metal oxide may be represented by Li—Mg—O.

According to the disclosed embodiments, an all-solid-state battery with high charge-discharge efficiency is provided.

BRIEF DESCRIPTION OF THE DRAWINGS

In the accompanying drawings.

DETAILED DESCRIPTION

The all-solid-state battery of the disclosed embodiments is an all-solid-state battery, wherein the all-solid-state battery comprises a cathode comprising a cathode layer, an anode comprising an anode layer, and a solid electrolyte layer disposed between the cathode layer and the anode layer;

wherein the anode layer contains at least one selected from the group consisting of a lithium metal and a lithium alloy; and wherein a protective layer comprising a composite metal oxide represented by Li—M—O (where M is at least one metal element selected from the group consisting of Mg, Au, Al and Sn) is disposed between the anode layer and the solid electrolyte layer.

In the disclosed embodiments, "lithium secondary battery" means a battery in which at least one of a lithium metal and a lithium alloy is used as the anode active material and a lithium metal precipitation-dissolution reaction is used as an anode reaction.

In the disclosed embodiments, "when the all-solid-state battery is fully charged" means that the SOC (state of charge) value of the all-solid-state battery is 100%. The SOC means the percentage of the charge capacity with respect to the full charge capacity of the battery. The full charge capacity is a SOC of 100%.

For example, the SOC may be estimated from the open circuit voltage (OCV) of the all-solid-state battery.

The techniques disclosed in Patent Literatures 1 and 2 focused on the interface between the current collector and the anode layer. However, since the reaction in the interface between the solid electrolyte layer and the anode layer is faster than the reaction in the interface between the current collector and the anode layer, the resistance increase rate of the all-solid-state battery in which no treatment is given to the interface between the solid electrolyte layer and the anode layer, is thought to increase along with repeated charge-discharge cycles.

A lithium metal is highly reductive and is problematic in that when contained in the anode layer, it reacts with the solid electrolyte contained in the solid electrolyte layer being in contact with the anode layer and results in the formation of a resistive layer between the anode layer and the solid electrolyte layer.

In addition, there is the following problem: during the all-solid-state battery is charged/discharged, the resistance of the resistive layer is increased, thereby decreasing the battery characteristics of the all-solid-state battery, such as charge-discharge efficiency and durability.

The disclosed embodiments provide an all-solid-state battery which is, by disposing the protective layer comprising the composite metal oxide in the interface between the anode layer and the solid electrolyte layer, configured to suppress an increase in the resistance of the interface between the anode layer and the solid electrolyte layer, and which is provided with excellent battery characteristics.

Figure 1:
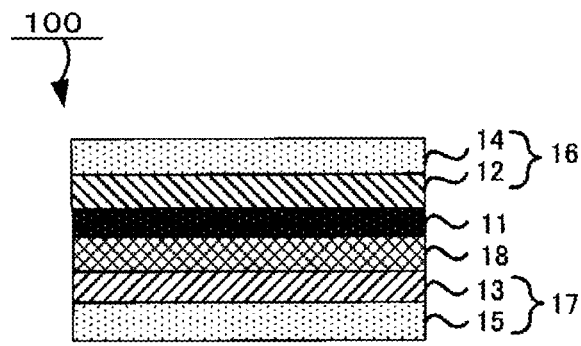
FIG. 1 is a schematic sectional view of an example of the all-solid-state battery of the disclosed embodiments when the battery is fully charged.

As shown in FIG. 1, an all-solid-state battery 100 comprises a cathode 16 comprising a cathode layer 12 and a cathode current collector 14, an anode 17 comprising an anode layer 13 and an anode current collector 15, a solid electrolyte layer 11 disposed between the cathode layer 12 and the anode layer 13, and a protective layer 18 disposed between the solid electrolyte layer 11 and the anode layer 13. When the anode layer 13 is composed of a lithium metal, the anode layer 13 may be dissolved and lost in the all-solid-state battery 100 before being initially charged or after being fully discharged.

Protective Layer

The protective layer is disposed between the anode layer and the solid electrolyte layer.

The protective layer comprises a composite metal oxide represented by Li—M—O (where M is at least one metal element selected from the group consisting of Mg, Au, Al and Sn).

The composite metal oxide may be an oxide of an alloy of Li and at least one metal element selected from the group consisting of Mg, Au, Al and Sn. As the oxide, examples include, but are not limited to, an oxide of a Li—Mg alloy (Li—Mg—O), an oxide of a Li-gold alloy (Li—Au—O), an oxide of a Li—Al alloy (Li—Al—O), and an oxide of a Li—Sn alloy (Li—Sn—O). From the viewpoint of increasing the charge-discharge efficiency of the all-solid-state battery, the oxide may be an oxide of a Li—Mg alloy (Li—Mg—O).

The composite metal oxide may be in any one of a solid solution state, an eutectic state and an intermetallic compound state.

The Li—M—O may be a composite metal oxide represented by $Li_x$—M—$O_y$ (where M is at least one metal element selected from the group consisting of Mg, Au, Al and Sn; $0<x\leq4$; and $1\leq y\leq2$).

A Li—Mg—O example is $Li_2MgO$, which is presumed to be produced by, for example, charging the all-solid-state battery and the resulting reaction represented by the following formula (1):

$$MgO+2Li \rightarrow Li_2MgO \quad \text{Formula (1):}$$

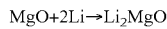

A Li—Au—O example is $Li_2AuO$, which is presumed to be produced by, for example, charging the all-solid-state battery and the resulting reaction represented by the following formula (2):

$$AuO+2Li \rightarrow Li_2AuO \quad \text{Formula (2):}$$

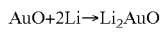

A Li—Al—O example is $2Li_3AlO_{1.5}$, which is presumed to be produced by, for example, charging the all-solid-state battery and the resulting reaction represented by the following formula (3):

$$Al_2O_3+6Li \rightarrow 2Li_3AlO_{1.5} \quad \text{Formula (3):}$$

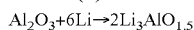

A Li—Sn—O example is $Li_4SnO_2$, which is presumed to be produced by, for example, charging the all-solid-state battery and the resulting reaction represented the following formula (4):

$$SnO_2+4Li \rightarrow Li_4SnO_2 \quad \text{Formula (4):}$$

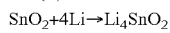

The percentage of the elements contained in the composite metal oxide may vary depending on the type of the contained metal M, the degree of oxidation, etc.

For the percentage of the Li element in the composite metal oxide, for example, the lower limit may be 30.0 atomic % or more, and the upper limit may be 99.9 atomic % or less. The percentage of any element in the composite metal oxide may be calculated by elemental analysis of the composite metal oxide by X-ray photoelectron spectroscopy (XPS). The percentage of the elements in the composite metal oxide may be calculated by elemental analysis of the composite metal oxide by XPS while the composite metal oxide is in an absolutely dissolved state.

From the viewpoint of increasing the charge-discharge efficiency of the all-solid-state battery, the thickness of the protective layer may be from 30 nm to 300 nm.

The method for forming the protective layer is not particularly limited. For example, the protective layer comprising the composite metal oxide may be formed by vacuum deposition of the composite metal oxide on one surface of the solid electrolyte layer or anode layer, using an electron beam evaporation device.

Another method for forming the protective layer may be the following method, for example.

First, using an electron beam evaporation device, a metal layer containing at least one metal selected from the group consisting of Mg, Au, Al and Sn, is formed by vacuum deposition of the metal on one surface of the solid electrolyte layer or anode current collector. Then, a cathode layer containing at least one kind of cathode active material selected from the group consisting of a lithium metal, a lithium alloy and a lithium compound, is prepared. The cathode layer, the solid electrolyte layer, the metal layer and the anode current collector are disposed in this order to prepare a battery precursor. By charging the battery precursor, lithium ions are transferred from the cathode layer to the metal layer and reacted with the metal in the metal layer. By this reaction, the protective layer comprising the Li—M—O composite metal oxide is formed on the metal layer-side surface of the solid electrolyte layer. Accordingly, the protective layer is obtained.

In general, the surface of the metal layer is covered with the oxide layer. Accordingly, by charging the battery precursor, the oxide layer on the surface of the metal layer reacts with lithium ions to form, on the solid electrolyte layer surface, a composite metal oxide layer containing a Li—M—O alloy. The composite metal oxide layer is more stable than the lithium metal, functions as the protective layer for suppressing a reaction between the lithium metal and the solid electrolyte, and provides high lithium ion conductivity due to its lithium element content. Accordingly, once the protective layer is formed, the protective layer is not lost even if the precursor battery is discharged. In the charging of the precursor battery, once the protective layer is formed, using the protective layer as a precipitation starting point, at least one of the lithium metal and the lithium alloy is further precipitated on the protective layer to form the anode layer. Accordingly, the all-solid-state battery in which the protective layer is disposed between the anode layer and the solid electrolyte layer, is obtained.

Cathode

The cathode comprises the cathode layer. As needed, it comprises a cathode current collector.

The cathode layer contains the cathode active material. As optional components, the cathode layer may contain a solid electrolyte, an electroconductive material and a binder, for example.

The type of the cathode active material is not particularly limited. The cathode active material can be any type of material that is usable as an active material for all-solid-state batteries. When the all-solid-state battery is an all-solid-state lithium secondary battery, as the cathode active material, examples include, but are not limited to, a lithium metal (Li), a lithium alloy, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), lithium compounds (such as LiCoN, $Li_2SiO_3$ and $Li_4SiO_4$), transition metal oxides (such as $V_2O_5$ and $MoO_3$), $TiS_2$, Si, $SiO_2$ and lithium storage intermetallic compounds (such as $Mg_2Sn$, $Mg_2Ge$, $Mg_2Sb$ and $Cu_3Sb$). As the lithium alloy, examples include, but are not limited to, Li—Au, Li—Mg, Li—Sn, Li—Si, Li—Al, Li—Ge, Li—Sb, Li—B, Li—C, Li—Ca, Li—Ga, Li—As, Li—Se, Li—Ru, Li—Rh, Li—Pd, Li—Ag, Li—Cd, Li—Ir, Li—Pt, Li—Hg, Li—Pb, Li—Bi, Li—Zn, Li—Tl, Li—Te, Li—At and Li—In.

The form of the cathode active material is not particularly limited. It may be a particulate form.

A coating layer containing a Li ion conducting oxide, may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. The thickness of the coating layer is 0.1 nm or more, for example, and it may be 1 nm or more. On the other hand, the thickness of the coating layer is 100 nm or less, for example, and it may be 20 nm or less. Also, for example, 70% or more or 90% or more of the cathode active material surface may be coated with the coating layer.

The content of the solid electrolyte in the cathode layer is not particularly limited. When the total mass of the cathode layer is determined as 100 mass %, the content of the solid electrolyte may be in a range of from 1 mass % to 80 mass %, for example.

As the solid electrolyte, examples include, but are not limited to, an oxide-based solid electrolyte and a sulfide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be sulfide glass, crystallized sulfide glass (glass ceramics) or a crystalline material obtained by developing a solid state reaction of the raw material composition.

The crystal state of the sulfide-based solid electrolyte can be confirmed by X-ray powder diffraction measurement using CuKα radiation, for example.

The sulfide glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired sulfide glass can be efficiently obtained.

The glass ceramics can be obtained by heating the sulfide glass, for example.

For the heating, the heating temperature may be a temperature higher than the crystallization temperature (Tc) of the sulfide glass, which is a temperature observed by thermal analysis measurement. In general, it is 195° C. or more. On the other hand, the upper limit of the heating temperature is not particularly limited.

The crystallization temperature (Tc) of the sulfide glass can be measured by differential thermal analysis (DTA).

The heating time is not particularly limited, as long as the desired crystallinity of the glass ceramics is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (1≤x≤3).

From the viewpoint of handling, the form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when particles are arranged in ascending order of their particle diameter, the accumulated volume of the particles is half (50%) the total volume of the particles (volume average diameter).

As the electroconductive material, a known electroconductive material may be used. As the electroconductive material, examples include, but are not limited to, a carbonaceous material and metal particles. The carbonaceous material may be at least one selected from the group consisting of carbon nanotube, carbon nanofiber and carbon blacks such as acetylene black (AB) and furnace black. Of them, from the viewpoint of electron conductivity, the electroconductive material may be at least one selected from the group consisting of carbon nanotube and carbon nanofiber. The carbon nanotube and carbon nanofiber may be vapor-grown carbon fiber (VGCF). As the metal particles, examples include, but are not limited to, particles of Ni, particles of Cu, particles of Fe and particles of SUS.

The content of the electroconductive material in the cathode layer is not particularly limited.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode layer is not particularly limited.

The thickness of the cathode layer is not particularly limited.

The cathode layer can be formed by a conventionally-known method.

For example, a cathode layer slurry is produced by putting the cathode active material and, as needed, other components in a solvent and mixing them. The cathode layer slurry is applied on one surface of a support such as the cathode current collector. The applied slurry is dried, thereby forming the cathode layer.

As the solvent, examples include, but are not limited to, butyl acetate, butyl butyrate, heptane and N-methyl-2-pyrrolidone.

The method for applying the cathode layer slurry on one surface of the support such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The support may be appropriately selected from self-supporting supports, and it is not particularly limited. For example, a metal foil such as Cu and Al may be used as the support.

The cathode layer may be formed by another method such as pressure-forming a powdered cathode mix that contains the cathode active material and, as needed, other components. In the case of pressure-forming the powdered cathode mix, generally, a press pressure of about 1 MPa or more and about 600 MPa or less is applied.

The pressure applying method is not particularly limited. As the method, examples include, but are not limited to, pressing by use of a plate press machine, a roll press machine or the like.

As the cathode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited and may be determined depending on desired performance.

Solid Electrolyte Layer

The solid electrolyte layer contains at least a solid electrolyte.

As the solid electrolyte contained in the solid electrolyte layer, a conventionally-known solid electrolyte that is usable in all-solid-state batteries, can be appropriately used. As such a solid electrolyte, examples include, but are not limited to, a solid electrolyte that can be incorporated in the above-described cathode layer.

As the solid electrolyte, one or more kinds of solid electrolytes may be used. In the case of using two or more kinds of solid electrolytes, they may be mixed together, or they may be formed into layers to obtain a multi-layered structure.

The proportion of the solid electrolyte in the solid electrolyte layer is not particularly limited. For example, it may be 50 mass % or more, may be in a range of 60 mass % or more and 100 mass % or less, may be in a range of 70 mass % or more and 100 mass % or less, or may be 100 mass %.

From the viewpoint of exerting plasticity, etc., a binder can be incorporated in the solid electrolyte layer. As the binder, examples include, but are not limited to, a binder that can be incorporated in the above-described cathode layer. However, the content of the binder in the solid electrolyte layer may be 5 mass % or less, from the viewpoint of, for example, preventing excessive aggregation of the solid electrolyte and making it possible to form the solid electrolyte layer in which the solid electrolyte is uniformly dispersed, for the purpose of easily achieving high power output.

The thickness of the solid electrolyte layer is not particularly limited. It is generally 0.1 µm or more and 1 mm or less.

As the method for forming the solid electrolyte layer, examples include, but are not limited to, pressure-forming a powdered solid electrolyte material that contains the solid electrolyte and, as needed, other components. In the case of pressure-forming the powdered solid electrolyte material, generally, a press pressure of about 1 MPa or more and about 600 MPa or less is applied.

The pressing method is not particularly limited. As the method, examples include, but are not limited to, those exemplified above in the formation of the cathode layer.

Anode

The anode comprises at least an anode layer. As needed, it comprises an anode current collector.

The anode layer contains an anode active material.

As the anode active material, examples include, but are not limited to, a lithium metal (Li) and a lithium alloy. As the lithium alloy, examples include, but are not limited to, Li—Au, Li—Mg, Li—Sn, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At.

As long as the lithium metal (Li) or the lithium alloy is contained as an anode active material and as a main component in the anode layer, another conventionally-known anode active material may be contained. In the disclosed embodiments, the "main component" means a component that accounts for 50 mass % or more of the total mass of the anode layer.

As the anode current collector, a known metal that is usable as a current collector in all-solid-state batteries, can be used. As such a metal, examples include, but are not limited to, the above-exemplified metal materials that are usable as the cathode current collector.

The thickness of the whole anode is not particularly limited.

As needed, the all-solid-state battery comprises an outer casing for housing the cathode, the anode and the solid electrolyte layer.

As the form of the outer casing, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

The all-solid-state battery may be an all-solid-state lithium secondary battery.

As the form of the all-solid-state battery, examples include, but are not limited to, a coin form, a laminate form, a cylindrical form and a square form.

The all-solid-state battery production method of the disclosed embodiments may be as follows, for example. First, the solid electrolyte layer is formed by pressure-forming a powdered solid electrolyte material. Next, the cathode layer is obtained by pressure-forming a powdered cathode mix that contains the cathode active material containing the lithium element on one surface of the solid electrolyte layer. Then, by vacuum deposition of the composite metal oxide using the electron beam evaporation device, the protective layer comprising the composite metal oxide is formed on the opposite surface of the solid electrolyte layer to the surface on which the cathode layer is formed. In addition, the anode active material is disposed on the protective layer to obtain the anode layer. Accordingly, a cathode layer-solid electrolyte layer-protective layer-anode layer assembly is obtained. As needed, a current collector is attached to the assembly, thereby obtaining the battery precursor.

In this case, the press pressure applied for pressure-forming the powdered solid electrolyte material and the powdered cathode mix, is generally about 1 MPa or more and about 600 MPa or less.

The pressing method is not particularly limited. As the pressing method, examples include, but are not limited to, those exemplified above in the formation of the cathode layer.

EXAMPLES

Example 1

Using an electron beam evaporation device, Sn was evaporated to a thickness of 100 nm on one surface of a Cu foil, thereby forming a metal layer.

As a sulfide-based solid electrolyte, 101.7 mg of a $Li_2S$—$P_2S_5$-based material containing LiBr and LiI was prepared. The sulfide-based solid electrolyte was pressed at a pressure of 6 ton/cm$^2$, thereby obtaining a solid electrolyte layer (thickness 500 μm).

Next, a Li metal foil (thickness 150 μm) was disposed on one surface of the solid electrolyte layer. The Cu foil having the metal layer formed on one surface thereof, was disposed on the opposite surface of the solid electrolyte layer to the surface on which the Li metal foil was disposed, to ensure that the solid electrolyte layer and the metal layer were in contact with each other. They were pressed at a pressure of 1 ton/cm$^2$, thereby forming an evaluation battery 1 comprising the Li metal foil, the solid electrolyte layer, the metal layer and the Cu foil in this order.

Example 2

An evaluation battery 2 was obtained in the same manner as Example 1, except that using the electron beam evaporation device, Al was evaporated to a thickness of 100 nm on one surface of the Cu foil, in place of Sn, thereby forming the metal layer.

Example 3

An evaluation battery 3 was obtained in the same manner as Example 1, except that using the electron beam evaporation device, Au was evaporated to a thickness of 100 nm on one surface of the Cu foil, in place of Sn, thereby forming the metal layer.

Example 4

An evaluation battery 4 was obtained in the same manner as Example 1, except that using the electron beam evaporation device, Mg was evaporated to a thickness of 100 nm on one surface of the Cu foil, in place of Sn, thereby forming the metal layer.

Comparative Example 1

An evaluation battery 5 was obtained in the same manner as Example 1, except that the metal layer was not formed on one surface of the Cu foil.

Charge-Discharge Test

The evaluation battery 1 was left to stand for one hour in a thermostat bath at 25° C. to uniform the temperature of the inside of the evaluation battery 1.

Next, the evaluation battery 1 was charged at a constant current with a current density of 435 μA/cm$^2$ to form, in the interface between the solid electrolyte layer and the metal layer, a protective layer containing a composite metal oxide (Li—Sn—O) obtained by a reaction of an Sn oxide layer on one surface of the metal layer and lithium ions that were formed by the dissolution of the Li metal foil and then transferred to the metal layer side through the solid electrolyte layer. The evaluation battery 1 was kept charged to precipitate a Li metal on the protective layer. The charging of the evaluation battery 1 was terminated when the charge capacity of the evaluation battery 1 reached 4.35 mAh/cm$^2$. Accordingly, the evaluation battery 1 became an all-solid-state lithium secondary battery comprising the protective layer between the solid electrolyte layer and the anode layer containing the precipitated lithium metal. After 10 minutes passed, the evaluation battery 1 was discharged at a constant current with a current density of 435 μA/cm$^2$ to dissolve the Li metal precipitated on the protective layer. The discharging of the evaluation battery 1 was terminated when the voltage of the evaluation battery 1 reached 1.0 V.

The charge-discharge efficiency of the evaluation battery 1 was obtained by the following formula.

Charge-discharge efficiency (%)=(Discharge capacity/Charge capacity)×100

Figure 2:
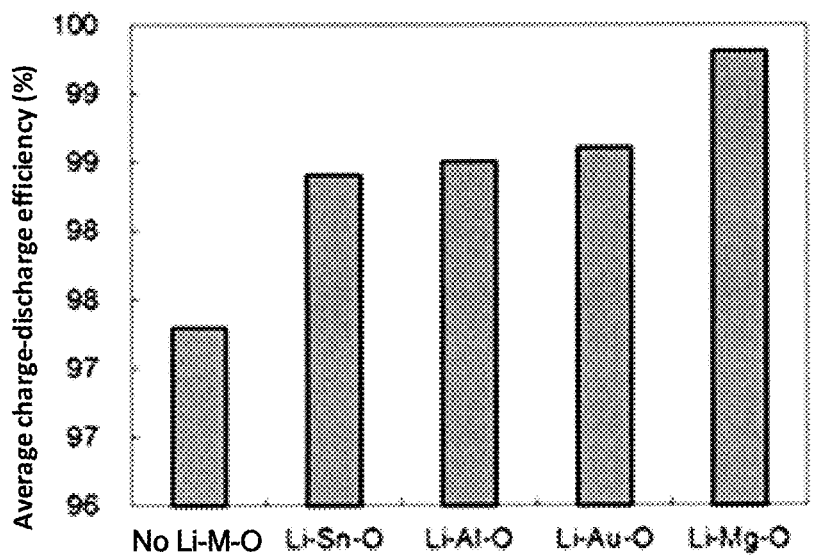
FIG. 2 is a graph showing the average charge-discharge efficiencies of evaluation batteries 1 to 5.

Then, the time between the start of the charging and the end of the discharging was determined as one cycle, and a total of 4 cycles of charging and discharging were repeated. The average charge-discharge efficiency of the evaluation battery 1 was calculated from the thus-obtained charge-discharge efficiencies of the evaluation battery 1. The result is shown in Table 1 and FIG. 2.

The average charge-discharge efficiencies of the evaluation batteries 2 to 5 were calculated in the same manner as the evaluation battery 1. The results are shown in Table 1 and FIG. 2. The protective layer of the evaluation battery 2 contained Li—Al—O as the composite metal oxide in place of Li—Sn—O. The protective layer of the evaluation battery 3 contained Li—Au—O as the composite metal oxide in place of Li—Sn—O. The protective layer of the evaluation battery 4 contained Li—Mg—O as the composite metal oxide in place of Li—Sn—O.

Resistance Measurement

In the charging of the first cycle of the evaluation battery 1, when the charge capacity of the evaluation battery 1 reached 1 mAh/cm$^2$, the voltage of the evaluation battery 1 was read as Li precipitation overvoltage, and the resistance value of the first cycle of the evaluation battery was obtained by the following formula. The result is shown in Table 1.

Resistance($\Omega$/cm$^2$)=Li precipitation overvoltage(V)/(435×10$^{-6}$(A/CM$^2$))

In the charging of the 4th cycle of the evaluation battery 1, when the charge capacity of the evaluation battery 1 reached 1 mAh/cm$^2$, the voltage of the evaluation battery 1 was read as Li precipitation overvoltage, and the resistance value of the 4th cycle of the evaluation battery 1 was obtained by the above formula. The result is shown in Table 1.

Figure 3:
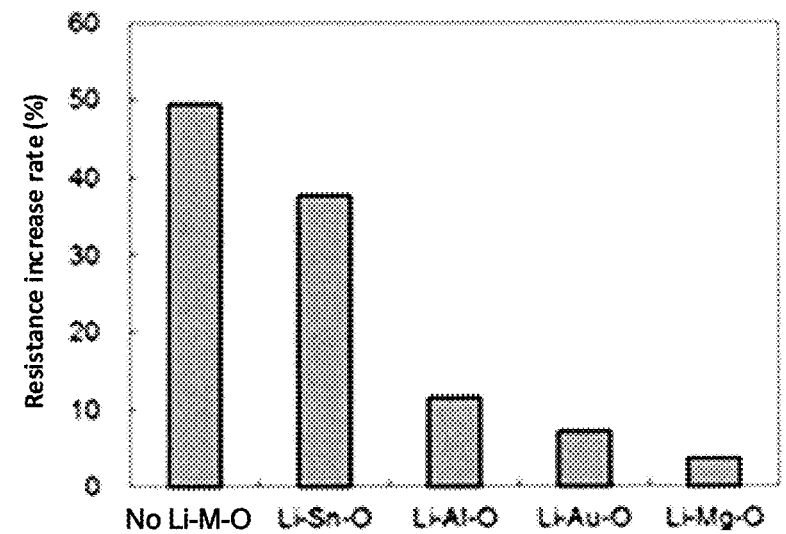
FIG. 3 is a graph showing the resistance increase rates of the evaluation batteries 1 to 5.

Then, from the resistance values of the first and 4th cycles of the evaluation battery 1, the resistance increase rate along with charge and discharge of the evaluation battery 1 was calculated by the following formula. The result is shown in Table 1 and FIG. 3.

Resistance increase rate (%)=[(Resistance value of 4th cycle−Resistance value of 1st cycle)/Resistance value of 1st cycle]×100

For the evaluation batteries 2 to 5, the resistance value of the first cycle, the resistance value of the 4th cycle, Δ(obtained by subtracting the resistance value of the first cycle from the resistance value of the 4th cycle) and the resistance increase rate were calculated in the same manner as the evaluation battery 1. The results are shown in Table 1 and FIG. 3.

XPS Measurement

After the first charge-discharge cycle of the evaluation battery 4 of Example 4, elemental analysis of the Cu foil-side surface of the solid electrolyte layer of the evaluation battery 4, was carried out in the depth direction from the surface by X-ray photoelectron spectroscopy (XPS). The scan rate was set to 25 nm/min, and the scan depth was set to 500 nm. That is, a thickness (500 nm) that was one-tenth of the thickness of the solid electrolyte layer (500 μm) from the Cu foil-side surface of the solid electrolyte layer, was scanned.

Figure 4:
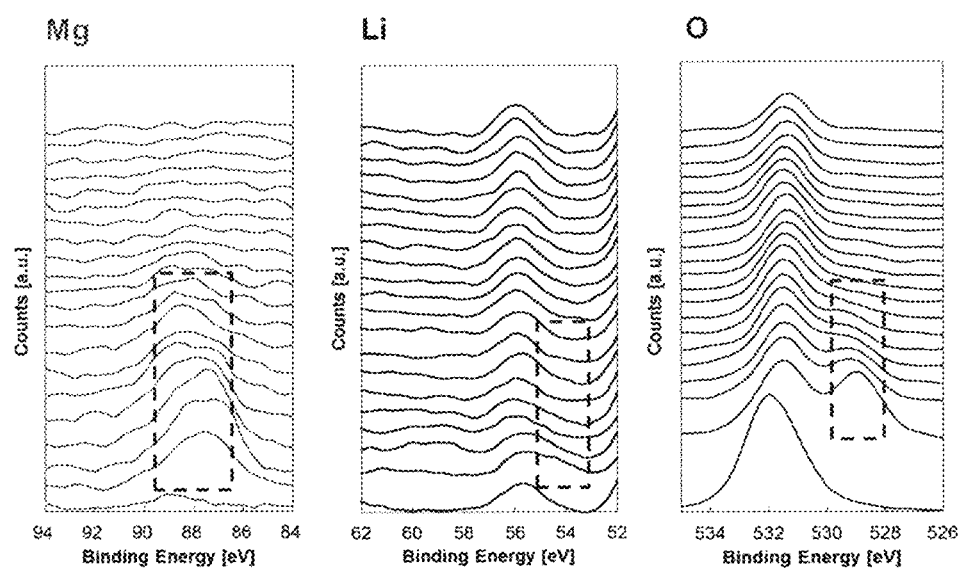
FIG. 4 is a view showing the results of XPS analysis in which elemental analysis was carried out to 500 nm in the depth direction from the Cu foul-side surface of the solid electrolyte layer contained in the evaluation battery 4 after the first charge-discharge cycle of Example 4.

The result is shown in FIG. 4. FIG. 4 is a view showing the results of XPS analysis in which elemental analysis was carried out to 500 nm in the depth direction from the Cu foil-side surface of the solid electrolyte layer contained in the evaluation battery 4 after the first charge-discharge cycle of Example 4.

As shown in FIG. 4, the presence of Li, Mg and oxygen elements was confirmed from the Cu foil-side surface of the solid electrolyte layer to a depth of about 300 nm thereof.

Accordingly, the formation of the protective layer having a thickness of 300 nm and containing the Li—Mg—O alloy, was confirmed on the Cu foil-side surface of the solid electrolyte layer of the evaluation battery 4 after the first charge-discharge cycle.

The reason why the composite metal oxide contained in the protective layer contained the oxygen element, is as follows: once the metal layer is formed on the surface of the Cu foil by vacuum deposition, the metal layer reacts with oxygen in the air to form a metal oxide layer, and the metal oxide layer reacts with lithium ions during the evaluation battery is charged.

TABLE 1

| | Protective layer | Average charge-discharge efficiency (%) | Resistance ($\Omega$) | | | Resistance increase rate (%) |
| --- | --- | --- | --- | --- | --- | --- |
| | | | 1st cycle | 4th cycle | Δ | |
| Example 1 | Li—Sn—O | 98.4 | 18.4 | 25.3 | 6.9 | 37.5 |
| Example 2 | Li—Al—O | 98.5 | 20.3 | 22.6 | 2.3 | 11.3 |
| Example 3 | Li—Au—O | 98.6 | 17.5 | 18.8 | 1.3 | 7.4 |
| Example 4 | Li—Mg—O | 99.3 | 18.6 | 19.3 | 0.7 | 3.8 |
| Comparative Example 1 | — | 97.3 | 20.4 | 30.5 | 10.1 | 49.5 |

Evaluation Result

For the evaluation battery 5 of Comparative Example 1 which did not contain the protective layer, the average charge-discharge efficiency was 97.3%, and the resistance increase rate after the 4th charge-discharge cycle with respect to the first charge-discharge cycle, was 49.5% and high.

For the evaluation batteries 1 to 4 of Examples 1 to 4, each of which contained the protective layer, their average charge-discharge efficiency was higher than the average charge-discharge efficiency of the evaluation battery 5 of Comparative Example 1, which did not contained the protective layer, and their resistance increase rate was lower. Especially for the evaluation battery 4 of Example 4, which used Li—Mg—O as the composite metal oxide, the average charge-discharge efficiency was 99.3% and high; the resistance increase rate was 3.8% and low; and the evaluation battery 4 showed excellent battery characteristics.

Accordingly, it was proved that the all-solid-state battery which is provided with high charge-discharge efficiency and configured to largely suppress an increase in resistance, is provided by the disclosed embodiments.

REFERENCE SIGNS LIST

11. Solid electrolyte layer
12. Cathode layer
13. Anode layer
14. Cathode current collector
15. Anode current collector
16. Cathode
17. Anode
18. Protective layer
100. All-solid-state battery

The invention claimed is:

1. An all-solid-state battery,
   wherein the all-solid-state battery comprises a cathode comprising a cathode layer, an anode comprising an anode layer, and a solid electrolyte layer disposed between the cathode layer and the anode layer;
   wherein the anode layer contains at least one selected from the group consisting of a lithium metal and a lithium alloy;
   wherein a protective layer comprising a composite metal oxide represented by Li—M—O, where M is at least one metal element selected from the group consisting of Mg, Au, Al and Sn, is disposed between the anode layer and the solid electrolyte layer; and
   wherein the protective layer does not contain a polymer.

2. The all-solid-state battery according to claim 1, wherein a thickness of the protective layer is from 30 nm to 300 nm.

3. The all-solid-state battery according to claim 1, wherein the M is at least one metal element selected from the group consisting of Mg, Au, and Sn.

* * * * *